Sept. 14, 1954    V. SCHLEYER    2,688,929
DEEP WELL PUMP
Filed Aug. 31, 1948    2 Sheets-Sheet 1
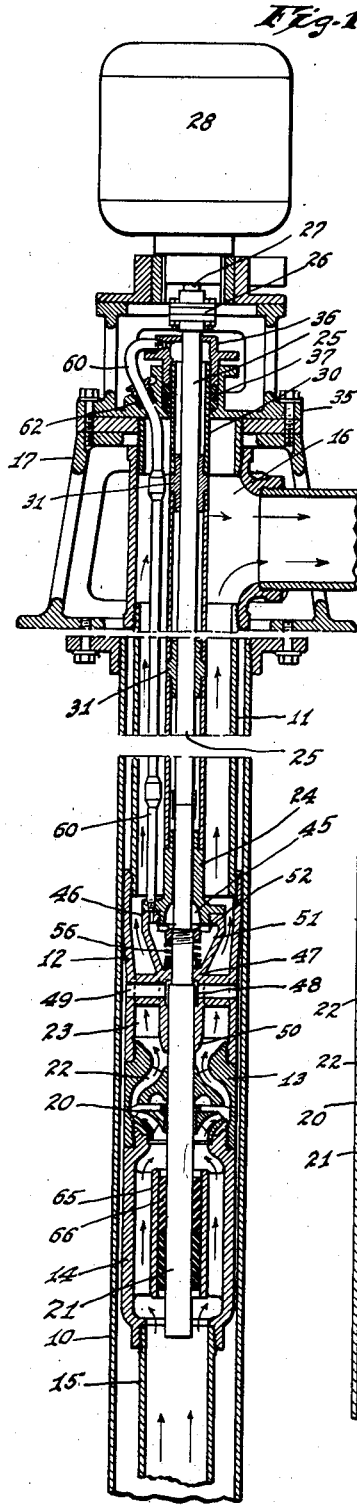
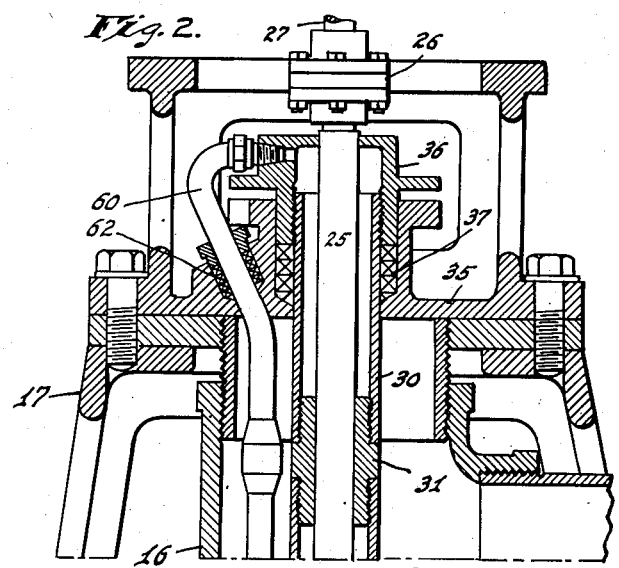
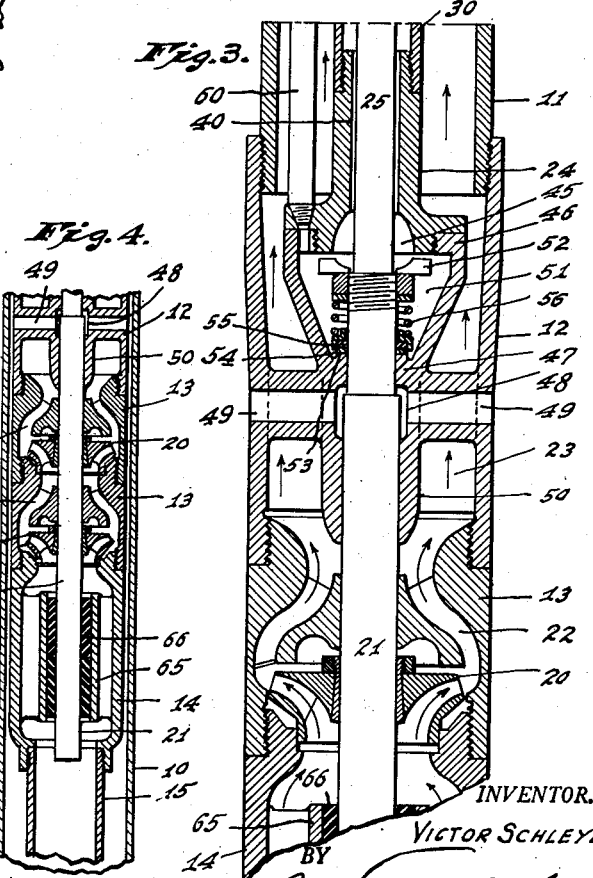
INVENTOR.
VICTOR SCHLEYER,
BY
ATTORNEYS.

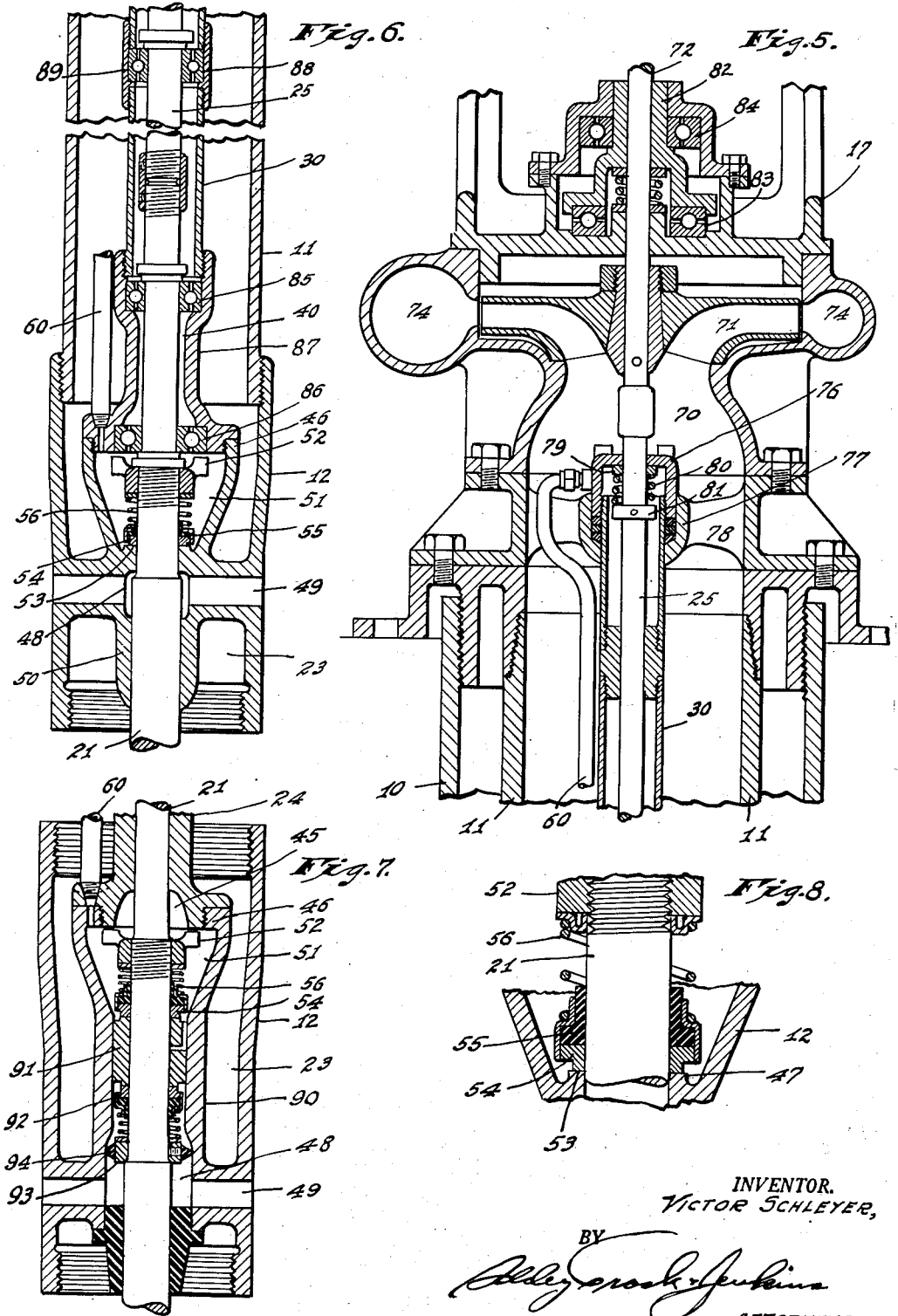

Patented Sept. 14, 1954

2,688,929

UNITED STATES PATENT OFFICE 2,688,929

DEEP WELL PUMP

Victor Schleyer, Anderson, Ind.

Application August 31, 1948, Serial No. 46,991

3 Claims. (Cl. 103—102)

This invention relates to a deep well centrifugal pump, especially to its bearings and their lubrication, and protection thereof from damage by the well water and by sand carried in the well water.

In the development of deep well pumps, great difficulty has been encountered in providing effective lubrication and protection for the moving parts of the pump and its bearings, especially the bearings for the line shaft connecting the motor at the surface of the well with the pump submerged in the water of the well. Many expedients have been proposed and many tried to overcome the difficulties. Among those expedients, for example, there were attempts to contain the bearings in a lubricant circuit separate from the water circuit, but the improvement obtained in reducing the amount of well sand which reached the bearings was limited, and wear soon occurred to a point of failure; at which the bearings were no longer protected and water and sand entered the separate lubricant circuit, especially under conditions of intermittent operation, and lubricant escaped from its circuit into the water and contaminated the water. The lack of adequate bearing protection has made it generally impractical to use anti-friction bearings, such as ball bearings, for the pump unit and its line shaft.

With the introduction of rubber bearings, the problem was largely laid aside; for the rubber bearings, while not solving the problem of bearing protection, substantially reduced the necessity for such protection; for they would withstand to a considerable extent the effects of sand in the well water and could be lubricated by that water itself. Such rubber bearings, however, leave considerable to be desired as bearings for a deep well centrifugal pump, especially under severe sand conditions in the well, and especially where the pump is operated intermittently. While the rubber bearings will withstand some sand in the lubricant water, they are rapidly damaged if operated dry. During periods of rest in intermittent operation, the water drains from the pump casing to its natural well level, which leaves dry the bearings above that level. When the pump is subsequently started, the bearings operate with inadequate or no lubricant until the water level again rises to them, and such operation causes rapid wear. Moreover, with such bearings, which are normally supported from the well pipe, it is difficult to obtain alinement of the shaft, with the result that whipping of the shaft occurs, especially after wear is started. This, in turn, accelerates the rate of wear and imposes undue strain and wear both on the submerged pump and on the motor if it is direct-connected to the line shaft.

It is the object of my invention to provide a deep well pump having a line- or transmission-shaft which is effectively sealed from the water circuit and can be installed and maintained accurately straight and true, and to provide for that sealed transmission shaft a separate lubricant circuit which effectively protects the bearings over long periods of time and excludes abrasives carried by the water circuit, and hence to permit the use of bearings of any desired type, including anti-friction bearings such as ball bearings. It is my further object, by this means, to relieve the pump of the damaging effects which result from whipping in the transmission shaft, thereby reducing the bearing requirements in the pump. It is a further object to provide in a deep-well pump a bearing combination of improved reliability and which avoids difficulties heretofore encountered. It is my further object to provide a combination of an adequately supported transmission shaft which may be maintained true, with effectively lubricated and protected bearings therefor, and with a pump and motor relieved of the damaging effects of whip, so that the pump embodying the combination will have a greatly lengthened life and improved reliability and will provide reliable and long-lived service even under extreme sand conditions in the well.

In accordance with my invention, the transmission-shaft of the pump is enclosed by a pipe, and shaft bearings are positioned at spaced points along such shaft within the enclosing pipe. Preferably, the shaft-enclosing pipe is held in tension, to obtain and maintain accurate alignment of the shaft bearings. The bearings are desirably rigid bearings, such as sleeve bearings or ball bearings, and they may be rubber bearings.

The shaft-enclosing pipe forms one leg of a lubricant circuit which includes an upper main bearing of the pump, the other leg of such lubricant circuit being formed by a separate return pipe, and such lubricant circuit is filled with liquid lubricant. To effectively seal the separate oil circuit in combination with this construction, I provide below the upper main bearing of the pump and above the pump runners thereof, a rotary sealing ring sealed to the shaft and spring pressed into sealing engagement with a radial seat, and I so arrange the parts that the seal thus formed is subjected on one side to the pressure of the lubricant circuit and on the other side to no more than the static pressure of the water in the well. A small lubricant pump is provided, preferably in the form of a small runner on the pump shaft between the main pump bearing and the rotary seal, to circulate the lubricant through the lubricant circuit continuously during operation of the pump.

The bearings of the transmission shaft and a main bearing of the pump are thus always submerged in the clean lubricant of a separate lubricant circuit sealed from the well water under all conditions, whether during operation, or rest, or starting; and the bearings are fully lubricated and protected under all such conditions. With line-shaft bearings and a main pump bearing which are thus aligned and lubricated, other bearings in the pump proper (where such are necessary), may desirably be rubber bearings, for in the pump proper the bearings will always be submerged and hence not subject to operation while dry, and in the combination such other bearings may carry but supplemental loads.

The accompanying drawings illustrate my invention:

Fig. 1 is a vertical central section through a deep well pump embodying my invention; Figs. 2 and 3 are enlarged sections similar to that of Fig. 1 and showing the upper and lower ends of the pump of Fig. 1; Fig. 4 is a vertical central section similar to Fig. 1 but showing a multiple stage pump; Fig. 5 is a vertical section corresponding to Fig. 2 but showing a booster pump associated with the pump at the upper end of the water pipe; Fig. 6 is a vertical section of a modified construction embodying ball bearings; Fig. 7 is a vertical section of a modified lower end of the lubricant circuit, showing a double seal; and Fig. 8 is a vertical section showing details of the rotary seal.

In the pump shown in the drawings, the well casing 10 extends into the ground to a sufficient distance to secure submergence of the pump proper below the natural water level in the well casing. A water delivery pipe 11 is suitably supported within the well casing 10, and such pipe 11 supports at its lower end a main bearing housing 12. This in turn is connected to the pump unit 13, or as in Fig. 4 to the uppermost pump unit 13 when the pump is a multiple stage pump. The pump unit 13 (or the lowermost pump unit 13- may carry a tail bearing housing 14 and usually a tail pipe 15. The upper end of the water pipe 11 is connected to a discharge fitting 16 which is supported from a frame 17.

The pump is of the centrifugal type, and may be either a single stage pump as shown in Fig. 1 and comprising a single pump unit 13, or may be a multi-stage pump, in which case I prefer to construct it from a plurality of pump units 13 as shown in Fig. 4. Each pump unit 13 comprises a centrifugal runner 20 fixed on the pump shaft 21, and arranged to receive water from below and to discharge it upwardly into diffusers 22 leading either to the pump unit next above or to a water passage 23 through the bearing housing 12 and thence to the water pipe 11. The pump shaft 21 extends upwardly from the uppermost pump unit 13 through a sleeve 50 of the bearing housing 12 and thereabove through the main bearing 24, and is connected to the sectional transmission shaft 25. The upper end of the transmission shaft 25 may be connected by a coupling 26 to the shaft 27 of a driving motor 28 provided with suitable thrust bearings to carry the weight of the shafts.

A sectional pipe 30, connected at its lower end to the main bearing 24 encloses the full length of the line shaft 25, and supports transmission shaft bearings 31 at suitably spaced points along the shaft 25. Conveniently, the bearings 31 are positioned at the joints between the sections of the shaft enclosing pipe 30, and serve to connect those sections by threaded engagement with the ends thereof. The upper end of the shaft-enclosing pipe 30, beyond the discharge fitting 16, passes through an opening in a bottom plate 35 of the frame 17 into threaded engagement with internal threads of a supporting cap 36. Such cap 36 is supported by the frame 17, and is adjusted on the upper end of the pipe 30 to support such pipe 30 in tension. Desirably, the supporting cap 36 rests on a packing gland 37 in a suitable collar on the plate 35, so that tightening the fitting 36 also compresses the packing 37 to seal the pipe 30 from the water circuit.

The pipe 30 forms one leg of the lubricant circuit, extending the full length of that pipe 30, and the bearings 24 and 31 for the shaft are desirably provided with longitudinal passages 40 to permit flow of lubricant through that leg of the circuit.

The lower end of the main bearing 24 is enlarged to form a lubricant collecting chamber 45, and is threaded into a flange 46 whose supporting walls converge downwardly to a short sleeve 47 fitting closely about the pump shaft 21, and form a lubricant plenum chamber 51. Immediately below the sleeve 47 there is an annular chamber 48 about the shaft 21, in open communication through lateral passages 49 with the well space between the housing 12 and the well casing 10. Below the annular chamber 48 there is a sleeve 50 closely surrounding the shaft 21 and desirably somewhat longer than the sleeve 47, the lower end of such sleeve 50 being exposed to the water in the delivery passage 23.

Within the chamber 51 enclosed by the supporting walls of the flange 46, and immediately below the bearing 24, I provide a small lubricant runner 52 suitably fixed on the pump shaft 21. As is seen in Fig. 8, the upper end of the sleeve 47, at the bottom of the chamber 51, is formed to provide an annular flat face 53. Such face 53 is engaged by a rotary sealing member 54, sealed to the shaft 21, desirably by a resilient rubber-like sleeve packing 55, and spring pressed downwardly against the face 53 by a spring 56 which reacts against the lower face of the runner 52.

A lubricant return pipe 60 is connected to the chamber 51 outwardly beyond the runner 52 and extends upwardly to the top of the well, to form the return leg of the lubricant circuit. At its upper end, the pipe 60 passes through the lower plate 35 of the frame 17, is sealed therein by a suitable gland 62, and is connected to the space within the fitting 36 so that it discharges into the upper end of the pipe 30. In the pump of Figs. 1 to 3, the opening in the fitting 36 through which the shaft 25 passes need not be sealed, for the oil level may be well below this point so that there is little tendency for leakage at that opening.

Where it may be desired, the pump may be provided with a tail bearing, below the runner 20. I find that this is not always essential, but I prefer to provide a steady bearing at this point, and I prefer to use a rubber bearing for this purpose. Where such a tail bearing is provided, a tail bearing housing 14 is connected to the lower end of the pump, and is provided with a suitable spider 65 to support a rubber bearing 66 about the lower end of the shaft 21.

In use, the lubricant circuit is filled with the desired lubricant, preferably oil, which fills the space between the line shaft 25 and its enclosing pipe 30, the chambers 45 and 51, and the return pipe 60. The oil level need not reach the top of the pipe 30, but should be above the uppermost line-shaft bearing 31. As the pump is operated, the oil runner 52 induces a flow of oil outwardly from the chamber 45 to the chamber 51, and thence upwardly through the pipe 60 into the upper end of the pipe 30. This causes a downward flow of oil through the pipe 30, to provide a continuously renewed supply of lubricant for the line shaft bearings 31 and for the main bearing 24. Meanwhile, the main runner 20 of the pump moves water upwardly through the water pipe 11 to the discharge fitting 16. The water emerging from the diffusers 22 into the space 23 is at a pressure above the static pressure in the well, and some leakage through the sleeve 50 may ordinarily occur. Such leakage, however, will discharge into the annular chamber 48 and will return to the well through the radial passages 49.

The water in the annular chamber 48 will be at a pressure determined by the submergence of the pump in the well (with such depression thereof as may be caused by pump operation), and not by the pressure of the rising column of water as it emerges from the diffusers 22 of the pump. Accordingly, the seal at the sleeve 47, between the upper face 53 thereof and the rotary sealing member 54, will be subjected on the outside to water which will normally have little movement and will be under no great pressure. The other side of the seal 47, on the other hand, will be under pressure resulting from the head of lubricant in the circuit, and, during operation of the pump, such additional pressure above static pressure as may be caused by discharge of the lubricant runner 52 against the frictional resistance to flow in the return pipe 60.

Under these conditions, in which any tendency of the rotating sealing disk 54 to cause radial flow across its face will be opposed by the higher pressure in the chamber 51, and in which the elevation of pressure in that chamber 51 during pump operation will tend to seat the sealing disk 54 more effectively against its mating face 53, highly effective sealing is obtained between the lubricant circuit and the water circuit and that effective seal will persist to extend the life of the pump.

With the line shaft 25 supported throughout its length by the line shaft bearings 31, and with such line shaft bearings 31 positioned by the shaft-enclosing pipe 30 held under tension, the line shaft 25 will be held in substantially true alinement, and whipping will be substantially avoided. In these circumstances, the pump shaft 21 will be held in true alinement by the main bearing 24, supplemented by the line shaft bearings above it, and this in turn will enhance the persistant and effective sealing obtained by the rotary seal member 54. With the highly effective seal thus obtained between the lubricant and water circuits the lubricant will remain uncontaminated, and with good lubrication the main bearing 24 and the line shaft bearings 31 will maintain true alinement of the shafts throughout a long life.

In combination with the efficiently lubricated and truly alined main and line-shaft bearings of the pump, I find it highly effective to use a rubber bearing 66 as the tail bearing for the pump. The effectiveness of the other bearings in the combination substantially reduces the wear and bearing load imposed on the tail bearing, to minimize any resilience in the rubber bearing. Moreover, the rubber bearing is situated in an environment to take advantage of its characteristics, for it is always submerged and will be adequately lubricated at all times by the water of the well.

My pump thus obtains a combination of advantages not heretofore obtained in practice. It is especially suited to, and effective in, conditions of extreme amounts of sand and abrasives in the well, which cause rapid deterioration of other pumps.

When desired, or when conditions require, various modifications of my pump may be made, as indicated in Figs. 5 to 7. In Fig. 5, the deepwell pump is provided at its upper end with a booster pump. The upper end of the water pipe 11 is connected to the intake 70 to a centrifugal runner 71 mounted on the shaft 72, which is connected to and drives the line-shaft 25. The runner 71 discharges to a volute 74 for delivery as desired.

In this case, it is desirable to seal the upper end of the line-shaft enclosing pipe 30 from the water circuit. That pipe 30 is supported, desirably in tension, by a cap 76 threaded onto its upper end and supported on packing in a cup 77 held at the center of the water pipe 11 by spider arms 78. A rotary sealing disk 79, urged upwardly by a spring 80 from a collar 81 on the line-shaft 25, seats against the top wall of the cap 76 to form the desired seal. The lubricant return line 60 is connected to the cap 76 to discharge into the top of the pipe 30.

In Fig. 5, the shafts 25 and 72 are supported through a collar 82 on a thrust bearing 83, and the neck of the collar 82 is journalled in a radial bearing 84. The shafts may be driven in any suitable way, as by direct or belt connection to a motor.

Fig. 6 shows a modification entirely suited to my pump, but unsuited to ordinary deep well pumps. In such modification, the main bearing comprises a pair of ball bearings 85 and 86, whose inner races are mounted on the shaft 21 and whose outer races are received in a modified bearing housing 87. The line-shaft 25 is also mounted in ball bearings 88, such bearings having outer races received within the pipe section couplings 89 and held therein by abutment with the ends of the pipe sections 30.

Fig. 7 shows a modified sealing arrangement between the water circuit and lubricant circuit. In this case, the bearing housing 12 is made somewhat longer, and the walls of the chamber 51 merge at the bottom to a cylinder 90. A bearing 91 is received in such cylinder 90, and the upper end of such bearing 91 is formed to seat the rotary sealing disk 54. Below the bearing 91, within the cylinder 90, a second rotary seal 92 is carried by a collar 93 on the shaft 21 and seats against the lower end face of the bearing 91. To minimize access of water-borne solids to such lower rotary seal, the collar 93 is desirably provided with a resilient annular sling 94 extending outward toward and bearing against the inner wall of the cylinder 90.

In this modification of Fig. 7, the sleeve which embraces the shaft 21 below the pressure-relief chamber 48 is separate from the housing 12, and may be of different material, as of rubber.

I claim as my invention:

1. A deep well pump, comprising a centrifugal pump unit adapted to be submerged in a well, a shaft for driving said pump, a main bearing housing above said pump unit, a lubricant circuit separate from the water circuit of the pump and including a shaft-enclosing pipe leading upward from said main bearing and a return pipe leading to the upper end thereof, said lubricant circuit containing a lubricant pump and being substantially filled with lubricant, a lubricant-passing main bearing in said housing, a lubricant chamber in said circuit and formed about said shaft below said main bearing, a bearing sleeve embracing said shaft below said chamber and having seal faces at its opposite ends, a pressure-relief passage open to the shaft below said bearing sleeve and leading to the exterior of the housing, a second sleeve embracing the shaft between said pressure-relief passage and the pump, and rotary sealing disks sealed to said shaft and yieldingly urged into sealing relation with said sealing faces.

2. A deep well pump as defined in claim 1, in which said housing forms an annular space about the shaft between said bearing sleeve and pressure relief passage, in combination with a resilient slinger ring extending outwardly from the shaft and across said annular space.

3. In a deep well pump, a vertical rotary shaft, a submerged pump driven thereby, a shaft-enclosing pipe to contain a column of oil of greater height than the water in the well, a main bearing at the lower end of said pipe and adapted to pass lubricant, a lubricant chamber below said bearing, a lubricant impeller in the chamber and discharging thereto, a return pipe from said chamber to an upper point of said shaft-enclosing pipe, a shaft-embracing sleeve below the lubricant chamber, a pressure-relief passage from the shaft below said sleeve, the pump being below said pressure relief passage, a radial seal face at the upper end of said sleeve, a rotary seal carried by said shaft and yieldingly urged downward against said radial seal face, and a secondary shaft-seal between said pressure relief chamber and said sleeve.

References Cited in the file of this patent

UNITED STATES PATENTS

| Number | Name | Date |
|---|---|---|
| 1,665,459 | Hollander et al. | Apr. 10, 1928 |
| 1,868,150 | Potter | July 19, 1932 |
| 2,041,999 | Hait | May 26, 1936 |
| 2,166,404 | Hait | July 18, 1939 |
| 2,319,776 | Copeland | May 25, 1943 |
| 2,427,656 | Blom | Sept. 23, 1947 |

FOREIGN PATENTS

| Number | Country | Date |
|---|---|---|
| 459,945 | Germany | May 15, 1928 |